Nov. 1, 1966  B. KARLOVITZ  3,282,572
METHOD AND APPARATUS FOR SUPPLYING FUEL-AIR MIXTURES TO
INTERNAL COMBUSTION ENGINES

Filed Aug. 24, 1965  2 Sheets-Sheet 1

INVENTOR.
Bela Karlovitz

BY
Webb Mackey Burden
HIS ATTORNEYS

Nov. 1, 1966  B. KARLOVITZ  3,282,572
METHOD AND APPARATUS FOR SUPPLYING FUEL-AIR MIXTURES TO
INTERNAL COMBUSTION ENGINES
Filed Aug. 24, 1965  2 Sheets-Sheet 2

INVENTOR.
Bela Karlovitz
BY
HIS ATTORNEYS

United States Patent Office 3,282,572
Patented Nov. 1, 1966

3,282,572
METHOD AND APPARATUS FOR SUPPLYING FUEL-AIR MIXTURES TO INTERNAL COMBUSTION ENGINES
Bela Karlovitz, Pittsburgh, Pa., assignor to Combustion and Explosives Research, Inc., Pittsburgh, Pa., a corporation of Pennsylvania
Filed Aug. 24, 1965, Ser. No. 487,958
9 Claims. (Cl. 261—23)

This application is a continuation-in-part of my copending application Serial No. 117,101 filed June 14, 1961, and now abandoned, and relates to method and apparatus for supplying fuel-air mixtures to internal combustion engines, more particularly, to internal combustion engines of the spark ignition type. Specifically, it relates to internal combustion engines for automobiles.

Conventionally, automobile engines are supplied with an air-fuel mixture by a carburetor which directs a flow of air from the atmosphere to an intake manifold and thence into the cylinders of the engine. The flow of air in the carburetor passes through a venturi throat in which is positioned a nozzle connected to a source of liquid fuel. Due to the reduced pressure in the venturi throat, fuel is drawn from the nozzle which thus meters and atomizes the fuel which is thereafter carried in the air stream in the form of droplets. A throttle valve positioned in the carburetor downstream of the fuel nozzle regulates the air flow into the intake manifold.

Atomization of the fuel is dependent upon the speed of the air flow through the carburetor which is at a maximum at full speed, full throttle operation. Even at full speed, full power operation, the atomization of the fuel is not sufficiently fine to provide a uniform mixture of air and fuel. Also, because of the insufficient atomization, the relatively large fuel droplets separate out onto the walls of the carburetor and manifold and are carried by the friction of the air flow as a film along the walls. To improve these situations, the intake manifolds are heated to evaporate the fuel and thus obtain a more uniform fuel-air mixture and to recover the fuel from the walls. Heating the manifold, however, reduces the octane rating of the fuel and decreases the volumetric efficiency of the engine. Also, the separation of fuel from the air stream on the walls of the manifold produces an accumulation of liquid fuel in the manifold. This accumulation introduces a time delay between the metering and the use of the fuel which, under variable load conditions, causes temporary enrichment or leaning out of the mixture.

At lower operating speeds, the degree of atomization of the fuel decreases and the problem of obtaining a suitable fuel-air mixture with the fuel uniformly distributed through the mixture increases. Thus, when the engine is idling, extremely rich fuel-air mixtures are required to keep the engine operating smoothly. During idle operation, the rate of flow of the fuel-air mixture is so low that nonuniform fuel-air mixtures are produced. Therefore, a rich mixture is required so as to be certain that the leanest cylinder charge will still be ignitable. A rich fuel-air mixture cannot be avoided during deceleration to maintain a burnable mixture in the manifold which will be available when the operating conditions change from deceleration. If such a burnable mixture is not maintained in the manifold, the engine might hesitate or stop during the transition from deceleration to acceleration because of the transit time of the fuel-air mixture from the carburetor to the cylinders.

Part throttle operations call for a maximum economy mixture ratio and current practice is to maintain the fuel-air mixture near the stoichiometric. Leaner mixtures could be used at such operating conditions if it were not for nonuniform distribution of the fuel through the fuel-air mixture.

Full power operations require a full air flow and a rich mixture, i.e., 115 to 120 percent of the stoichiometric fuel requirement. Thus, under all circumstances, there is a nonuniform mixing of the fuel with the air with the result that, in many conditions of engine operation, the fuel-air mixture is overrich in fuel. The overrich fuel provides flexible engine operation, but it results in increased fuel consumption and incomplete fuel combustion which, in turn, produces carbon monoxide and other partially burned toxic components in the exhaust gases.

In accordance with my invention, it is possible to operate an internal combustion engine with stoichiometric or lean (less than stoichiometric) mixtures in all operating conditions except full power. This results in fuel economy, nearly complete combustion, and the substantial elimination of carbon monoxide and other toxic materials in the exhaust gases. In accordance with my invention, I atomize the fuel into droplets of such small size that only an insignificant portion of the fuel will separate from the air stream and the fuel is uniformly distributed throughout the mixture, thus providing an ignitable mixture for all phases of engine operation.

The degree of atomization necessary to produce this result can be estimated from the distance which suspended droplets of a given diameter move relative to the air if the air stream in which they are carried is brought to a standstill. This distance, known as the "slip distance," can be calculated from the formula:

$$s = \frac{1}{18}\frac{\rho}{\eta}D^2 U$$

Where $\rho$ is the density of the droplets $g/cm.^2$
$\eta$ is viscosity of air $g/cm.\ sec.$
$D$ is the diameter of the droplet cm.
$U$ is the velocity of the air stream cm./sec.

For example:

| | | |
|---|---|---|
| $D=5\mu$ | $U=1000$ cm./sec. (33 ft./sec.) | $s=0.05$ cm. |
| $D=5\mu$ | $U=5000$ cm./sec. (165 ft./sec.) | $s=0.25$ cm. |
| $D=10\mu$ | $U=1000$ cm./sec. | $s=0.2$ cm. |
| $D=10\mu$ | $U=5000$ cm./sec. | $s=1.0$ cm. |
| $D=15\mu$ | $U=1000$ cm./sec. | $s=0.45$ cm. |
| $D=15\mu$ | $U=5000$ cm./sec. | $s=2.26$ cm. |

These numbers show that the droplet size has to be in the order of $10\mu$, or smaller, if excessive separation of the droplets from the air stream is to be avoided.

As noted, air flow through the carburetor past the fuel nozzle does atomize the fuel, but this air flow will not produce fuel droplets having diameters of 10 microns or less.

Nukiyama and Tanasawa have developed an empirical formula which sets out the relationship between the average droplet size, the air flow velocity, and other parameters (High Speed Aerodynamics and Jet Propulsion, vol. II, p. 412, Princeton University Press, Princeton, New Jersey). Applied to stoichiometric mixtures of gasoline and air, this formula reduces to $$D=\frac{3400}{U}+1 \text{ micron}$$

where D is the average droplet diameter and U is air flow velocity in meters per second. Applying this formula, calculations show that air flow velocities in excess of the speed of sound are required to produce droplets smaller than 10 microns in diameter. Since air flows into a carburetor under atmospheric pressure, such air flow velocities are not available at every operating condition of the engine.

It is possible, however, to reduce further the size of the fuel droplets if a strong turbulence is created in the flow of the fuel-air stream. This is possible if the scale of turbulence is large as compared with the droplet diameter but not much larger than the slip distance. The limiting droplet size can be estimated from the work of R. D. Ingebo and H. H. Foster (NACA Tech. Note 4087, October 1957). The limiting droplet diameter is calculated to $$D_{min.} = \left(\frac{12}{V_s^{0.75}}\right)^2 \text{micron}$$

where $V_s$ is the turbulent fluctuating velocity in meters per second.

For example:
$V_s = 10$ m./sec.
$D_{min.} = 4.6$ microns

Although a long time would be required to approach closely the limiting droplet diameter, a droplet diameter of twice this size is obtained after a comparatively small number of velocity fluctuations.

In carrying out my invention, I provide a suitable turbulence in the air-fuel mixture before it flows either into the engine cylinders directly or into an intake manifold thence into the cylinders. This produces fuel droplets sufficiently small in size that they do not separate from the air stream and thus I provide a uniform fuel-air mixture. In accordance with my invention, fuel is metered into a high velocity air stream in the conventional manner but the diameter of the air intake channel is kept approximately constant from the fuel metering section to the throttle valve, thus dispensing with the usual venturi. A throttle valve is positioned downstream of the point of entrance of the fuel into the air stream and downstream of the throttle valve there is a turbulence chamber wherein the larger part of the kinetic energy of the air-fuel stream is converted into turbulence and a smaller part into pressure.

The fuel-air streams entering the turbulence chamber entrain fuel and air from their surroundings by turbulent mixing. The high velocity jets thereby create a back flow of air along the walls of the turbulence chamber. Larger fuel droplets thrown laterally from the high velocity streams cannot reach the walls of the turbulence chamber, but are carried back upstream and reentered into the high velocity fuel-air streams and thereby given a second chance for fine atomization. This is in sharp contrast to the performance of high velocity air jets in conventional carburetors in which fuel droplets leaving the high velocity stream are thrown to the wall and carried along the wall in the form of a liquid film.

If desired, a conventional idle fuel control system can be added to my apparatus and likewise a conventional pump or extra metering jet can be provided for maximum power conditions.

In the accompanying drawings, I have illustrated certain presently preferred embodiments of my invention, in which.

Figure 1:
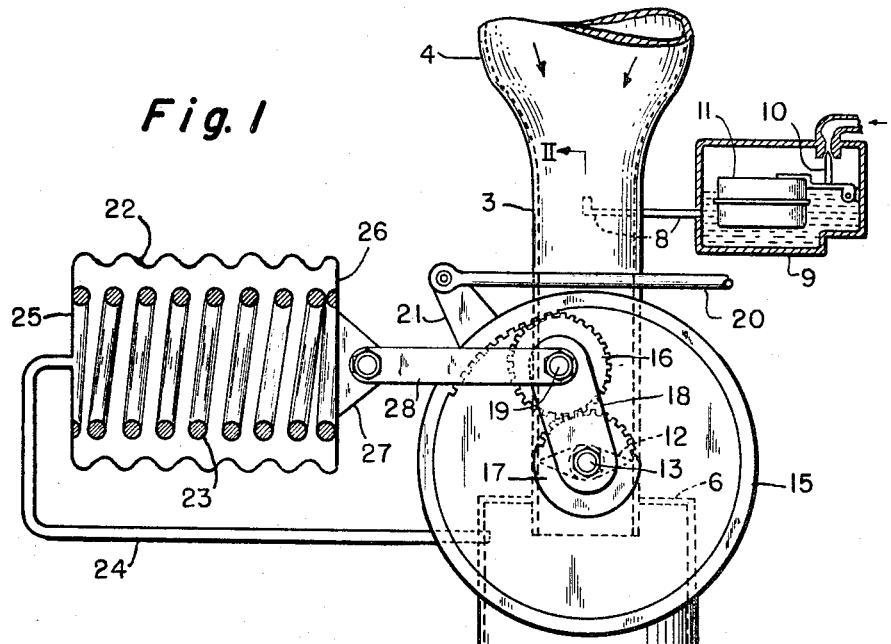
FIGURE 1 is a central vertical section through a carburetor embodying my invention and through a portion of an intake manifold to which the carburetor is attached.

Referring to the drawings, my carburetor includes an air intake channel 3 which preferably is in the form of a hollow cylinder but may have any other cross-sectional shape. The channel 3 has an outwardly flared mouth 4 at one end for the intake of air. The other end of the channel 3 extends into a second cylinder 5. As shown in FIGURE 1, the diameter of the cylinder 5 is more than twice the diameter of the channel 3 and the length of the cylinder 5 is four times the diameter of the channel 3. Preferably, the end of the channel 3 terminates in a sharp edge. The end of the cylinder 5 into which the channel 3 extends is closed by an end wall 6 through which the channel 3 extends. The other end of the cylinder 5 opens directly into an intake manifold 7 of an engine, a portion of which is shown in FIGURE 1.

The diameter of cylinder 5 should be at least twice the diameter of channel 3. Therefore, the cross-sectional area of the cylinder 5 is substantially greater than the cross-sectional area of the channel 3, and cylinder 5 provides an abrupt increase in area in the path through which the fuel-air mixture flows and, thus, the cylinder 5 acts as a turbulence chamber. Preferably, this chamber is cylindrical in cross-section, as shown, but it may have any other cross-sectional shape so long as it provides an abrupt increase in cross-sectional area for the air-fuel mixture flow at the downstream end of the channel 3. It should also have a length in the direction of flow of the fuel-air mixtures which is at least four times the diameter of channel 3.

A fuel nozzle 8, which is connected to a float chamber 9, housing a float valve 10 and float 11, extends into the intake channel 3. A throttle valve 12 is positioned in the channel 3 downstream of the nozzle 8 and is actuated by mechanism hereinafter described.

In operation, a stream of air flows through the channel 3, past the nozzle 8, and draws fuel from the nozzle which thus meters and partially atomizes the fuel. The fuel-air mixture flows down the tube, past the throttle valve 12, and issues immediately in the form of high velocity jets from the channel 3 into the central portion of the turbulence chamber provided by the cylinder 5. A large fraction of the kinetic energy of the fuel-air mixture flow is converted into turbulence by the abrupt increase of the cross-sectional area provided for the flow of the air-fuel mixture by the turbulence chamber. At least one-third of the kinetic energy of the air-fuel mixture flow should be converted into turbulence for good atomization. Preferably, a larger proportion of the energy is so converted. The strong turbulence created in the turbulence chamber breaks up the large fuel droplets and reduces the average diameter of the droplets below 10 microns. From the turbulence chamber, the fuel-air mixture flows into the intake manifold 7 of the engine.

It is apparent that, if a high degree of turbulence is to be created in the turbulence chamber formed by the cylinder 5, the air-fuel mixture jets should enter the turbulence chamber at high velocities. These velocities can be obtained only if the pressure in the turbulence chamber adjacent the downstream end of the channel 3 is less than atmospheric pressure. Preferably, the pressure drop within the turbulence chamber at the outlet end or downstream end of the channel 3 should be at least 4 inches of mercury, although a minimum pressure drop of 2 inches of mercury will create sufficient turbulence for satisfactory operation.

Such pressure drops are maintained when the engine is operating at full speed even with fully open throttle. Such pressure drops are also maintained at lower speeds and partially open throttle. However, if the throttle is opened at engine speeds less than the maximum speed, the pressure drop is not maintained. Therefore, I provide a mechanism for limiting the opening of the throttle valve so that the pressure drop between atmosphere and the turbulence chamber cannot drop below a predetermined minimum value.

The throttle valve 12 is mounted on a shaft 13 which extends transversely through the channel 3 and turns in bosses 14 secured to the outside of the channel 3. The valve 12 is keyed to the shaft 13 so that it rotates with that shaft. The shaft extends outwardly beyond one of the bosses 14 and carries an epicyclic gear train, which gear train has a ring gear 15, a planet gear 16 and a sun gear 17. The gear 15 turns freely on the shaft 13. An arm 18 also turns freely on the shaft 13 and, at its outer end, carries a stub shaft 19 about which the gear 16 rotates. The gear 16 meshes with both the ring gear 15 and the sun gear 17 which is keyed to the shaft 13.

A control for the engine (e.g., an accelerator pedal) is connected to the throttle valve through linkage 20 which is pivotally connected to a lug 21 extending outwardly from the ring gear 15. Moving the control linkage 20 to to the right (viewing FIGURE 1) opens the throttle valve 12 by turning the gear 15 clockwise which also rotates the gear 16 clockwise and the gear 17 counterclockwise.

The position of the throttle valve is also affected by the difference in pressure between atmosphere and pressure within the turbulence chamber 5. This is accomplished by a cylindrical metallic bellows 22 which is closed at both ends and has within it a spring 23 which tends to expand the bellows. A tube 24 connects the interior portion of the turbulence chamber which is adjacent its entrance with the interior of the bellows. The strength of the spring 23 is such that, if the pressure drop between atmosphere and pressure within the turbulence chamber is at or above a predetermined minimum value, the bellows is in its fully contracted position, which is the position shown in FIGURE 1. The tube 24 holds the closed end 25 of the bellows into which it extends in fixed position. The other closed end 26 has a flange 27 on which one end of a lever 28 is pivotally mounted. The other end of the lever 28 pivots on the stub shaft 19.

If the difference in pressure between atmosphere and pressure within the turbulence chamber becomes less than a predetermined minimum value, then the spring 23 will expand the bellows 22 and, since the closed end 25 is fixed, the other end 26 will move to the right (viewing FIGURE 1) and move the arm 18 clockwise about the shaft 13. This will turn the planet gear 16 counterclockwise and the sun gear 17 clockwise, thus tending to close the valve.

When the bellows is in its fully contracted position, the control linkage can turn the throttle valve from idle position to fully open position; but the throttle valve can be opened fully only when the bellows is in that position. If the speed of the engine is such that wide opening of the throttle valve reduces the difference in pressure between atmosphere and pressure in the turbulence chamber below the prescribed minimum value, the bellows expands. As explained above, this action tends to close the throttle valve and thus limit the amount of the opening of the throttle valve irrespective of the position of the control linkage. At any engine speed, therefore, the control linkage cannot open the throttle valve to such an extent that the predetermined minimum value of the pressure drop between atmosphere and the pressure in the turbulence chamber is not maintained. The predetermined minimum pressure drop is necessary to produce the minimum velocity required for good atomization. However, the pressure drop should not materially exceed that required for good atomization because an excess pressure drop would reduce the absolute pressure of the fuel air-mixture reaching the cylinders and therefore reduce the mass of the mixture delivered to the cylinders at the given engine speed and, consequently, the power developed by the engine. My device limits the opening of the throttle valve when the gas pedal is fully depressed in such a manner that the predetermined pressure drop is maintained, but is not materially exceeded. This is accomplished by using the difference in pressure between atmospheric pressure and pressure within the turbulence chamber to actuate the control mechanism.

The arrangement of the mechanism just described can be reversed. That is, the control linkage can be connected to the arm 18 and the lever 28 can be connected to the lug 21 on the gear 15.

The following data is supplied for "open throttle" operation of an engine:

Pressure drop from the atmosphere to the entrance of the turbulence chamber _____inches__ 4
Pressure recovery in the turbulence chamber __do___ 1.5
    Remaining pressure drop _____do___ 2.5
Velocity of air stream entering the turbulence chamber _____ $U = 157$ m./sec.
Turbulent fluctuating velocity _____ $V_s = 119$ m./sec.
Initial droplet diameter produced by the air stream _____ $D = 23\mu$.
Limiting diameter of droplets produced by turbulence _____ $D_{min.} = 1.2\mu$.

It is to be expected, therefore, that under the above conditions the average droplet diameter will be in the order of a few microns.

At "open throttle" operation of an engine, the pressure drop in a conventional carburetor from atmosphere to engine cylinder is a maximum of 1 inch of mercury. It will be seen from the above that my carburetor creates a pressure drop of 2½ inches of mercury and, in this respect, the quantity of fuel-air mixture per unit of time delivered by my carburetor is less than the conventional carburetor. However, my carburetor eliminates the need for manifold heating of the air-fuel mixture. Heating the mixture expands the volume of the air-fuel mixture and thereby the quantity of fuel per unit of time delivered to the cylinders is correspondingly reduced. Calculations show that, if the temperature of an air-fuel mixture delivered to the cylinders of an engine by my carburetor is approximately 22° F. less than the temperature of an air-fuel mixture delivered by conventional carburetors, the loss in pressure caused by my carburetor is compensated by the lower air temperature.

Figure 2:
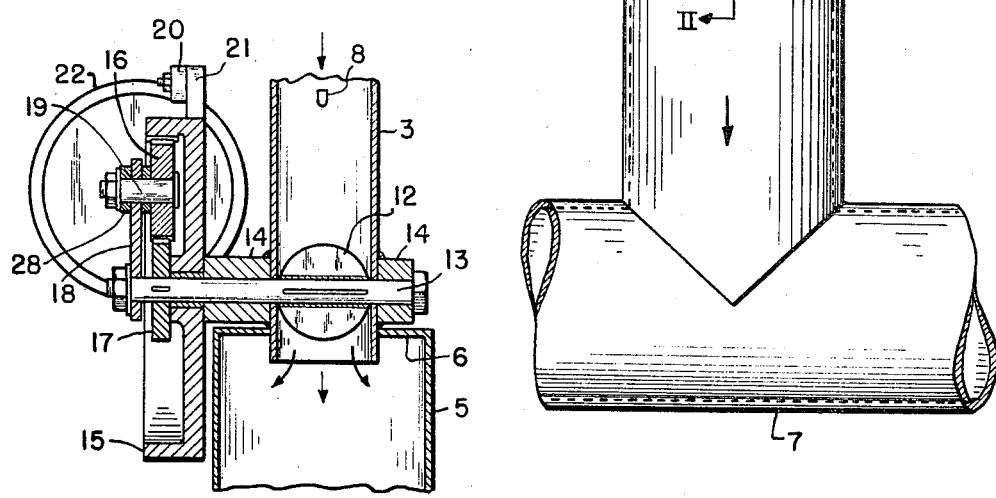
FIGURE 2 is a side view of the portion of the carburetor shown in FIGURE 1 which is indicated by the arrows II—II in FIGURE 1.
Figure 3:
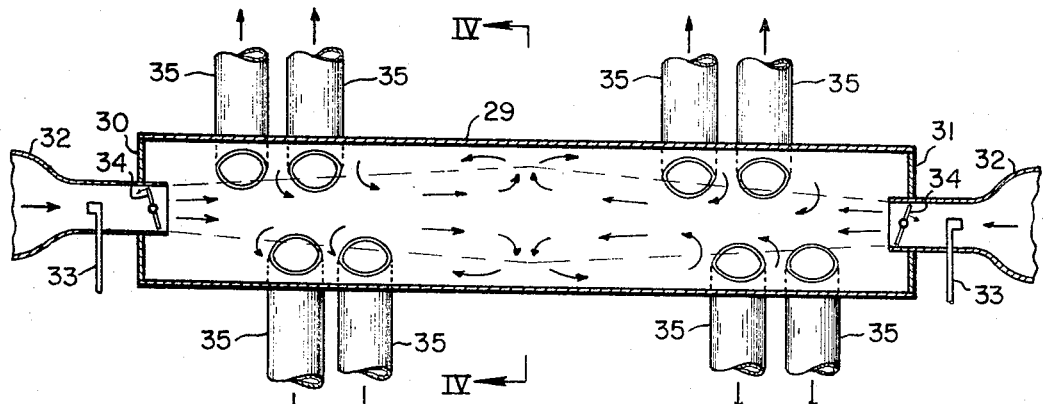
FIGURE 3 is a central horizontal section of a modified form of my invention.
Figure 4:
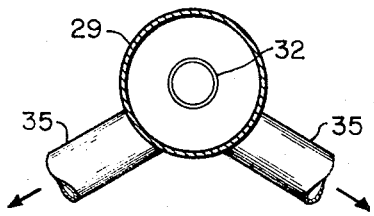
FIGURE 4 is a section along the line III—III in FIGURE 3.
Figure 5:
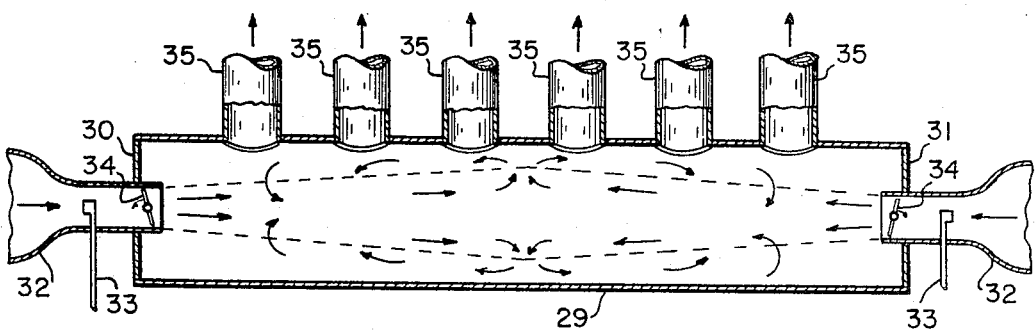
FIGURE 5 is a central horizontal section of a further embodiment of my invention.

The apparatus shown in FIGURES 1 and 2 provides fuel air mixtures in which the fuel is uniformly distributed throughout the mixture. However, a certain amount of separation of the larger droplets of fuel from the air will occur because the flow of the fuel air mixture makes a 90° turn when flowing from the turbulence chamber into the manifold and another turn from the manifold into the ducts leading from the manifold to the individual cylinders of the engine. FIGURES 3 to 5, inclusive, show modifications of my invention whereby the number of turns that a fuel air mixture makes between the air and fuel intakes and the cylinders is minimized. This is done by using a single chamber which functions both as a turbulence chamber and as an intake manifold.

Referring to FIGURE 3, the modified form of the apparatus comprises an elongated chamber 29 having opposed ends 30 and 31 in which are mounted air intake channels 32 each of which is the same as the intake channel 3 shown in FIGURES 1 and 2, and each of which extends into the chamber 29 as the channel 3 extends into the chamber 5. Fuel nozzles 33 extend into the intake channels 32 and are supplied with fuel in the same manner as the fuel nozzles 8 previously described. Throttle valves 34 are mounted in the ends of the intake channels 32 which extend into the chamber 29. These throttle valves are controlled by mechanism which is the same as the control mechanism for the throttle valve 12 which is shown in FIGURES 1 and 2 but which is not shown in FIGURES 3 to 5, inclusive, in order to simplify these figures.

Ducts 35 opening into and extending from the sides of the chamber 29 lead to individual cylinders of an engine. The apparatus shown in FIGURE 3 is intended for a V-8 engine and the chamber 29 extends the length of the engine and in the V between the two banks of cylinders of a conventional V-8 engine. The ducts 35 are positioned along the length of the chamber 29 so that they extend the minimum distance between the chamber 29 and the intake ports of the individual cylinders.

As in the case of the apparatus shown in FIGURES 1 and 2 the chamber 29 provides an abrupt increase in cross-sectional area for the flow of fuel air mixtures from the channels 32 into the chamber 29 and thereby the chamber 29 provides in effect a turbulence chamber for each of the fuel air intake systems comprising the air intake channels 32 and fuel nozzles 33. Preferably, the chamber 29 has such length that it provides a turbulence chamber for each inlet system each having a length in the direction of fuel air flow into the chamber which is at least equal to twice the maximum dimension of the chamber in a direction transverse to the direction of air flow.

In operation of the engine, fuel air mixtures flow in the form of high velocity jets from the channels 32 into the turbulence chambers at each end of the chamber 29 and a large fraction of the kinetic energy of the fuel air jets is converted into turbulence. Within each half portion of the channel 29 a fuel air mixture circulates in the manner indicated by the arrows in FIGURE 3. The fuel air mixture from each intake channel 32 will travel to approximately the midpoint of the chamber 29 and be drawn backwardly towards the channel 32 from which it emerged by suction from the engine cylinders. As indicated by the arrows, there will be a circular current of fuel-air mixture containing finely atomized and uniformly distributed fuel particles which flows from each channel 32 along the central axis of the chamber and back towards the ducts 35 along the inner walls of the chamber 29.

Some of the larger particles flowing from each end of the chamber 29 may go beyond the midpoint of the chamber 29 but they will not be lost since they will be picked up in the stream of the fuel-air mixture which is generated in the opposite end of the chamber.

As shown in FIGURE 3, the only turn which the fuel-air mixture encounters in flowing from the air and fuel intakes to the cylinders occurs when mixture flowing along the inner wall of chamber 29 is drawn into one of the ducts 35. Even at this turn, however, the separation of fuel from the air fuel mixture can be minimized by keeping small the velocity of the air fuel stream which flows along the inner walls of the chamber 29. Moreover, a substantial portion of the fuel-air mixture will flow directly from the chamber 29 into one of the ducts 35 and thence into an engine cylinder.

As is the case in the operation of the apparatus shown in FIGURES 1 and 2, it is necessary that the throttle valves 34 be regulated so that a predetermined pressure drop is maintained between atmosphere and the interior portions of the chamber 29 which are adjacent the openings of the intake channels 32. This regulation is accomplished by regulating mechanism which is the same as that used to regulate the throttle valve 12 in the apparatus shown in FIGURES 1 and 2.

FIGURE 5 shows a modification of the apparatus shown in FIGURE 3 to adapt it for use with a straight 6 cylinder engine. The apparatus of FIGURE 5 is the same as that of FIGURE 3 except that ducts 35 leading to individual engine cylinders are all mounted on one side of the chamber 29 and the chamber 29 is mounted along one side of the block of the engine. The operation of the apparatus shown in FIGURE 5 is the same as that of the apparatus shown in FIGURE 3.

My method and apparatus for supplying fuel-air mixtures to internal combustion engines have a number of advantages over the methods and apparatus now known for accomplishing this purpose. Some of the advantages are:

(1) Lean (less than stoichiometric) fuel-air mixtures can be used for all operating conditions, except for maximum power. Maximum power is developed only when the engine is operating under full load with the throttle wide open and, therefore, occasions for its use are rare. The fact that lean fuel-air mixtures can be used is due to the fact that my invention provides uniform distribution of the fuel through the fuel-air mixture.

(2) Fuels having high volatility are not required because my invention does not depend upon evaporation of the fuel to provide a burnable mixture.

(3) A choke is not needed to start a cold engine.

(4) There is nearly complete combustion of the fuel, thus practically eliminating carbon monoxide and other noxious components from exhaust gases.

(5) The combination turbulence chamber and intake manifold used in some embodiments of my invention minimizes the number of turns in the flow paths of the fuel-air mixture from the carburetor to the cylinders and thereby reduces the number of fuel droplets which are separated from the mixture. In such embodiments, fuel-air mixture can be used which are leaner than those used in embodiments having a turbulence chamber and an intake manifold resulting in more complete combustion and cooler combustion products. The production of oxides of nitrogen will also be reduced.

While I have described certain presently preferred embodiments of my invention, it is to be understood that it may be otherwise variously embodied within the scope of the appended claims.

I claim:

1. Apparatus for supplying fuel-air mixtures to the cylinders of an internal combustion engine comprising an air intake channel, a fuel nozzle opening into the channel, a throttle valve in the channel downstream of the fuel nozzle, a turbulence chamber positioned immediately downstream of the throttle valve into which the fuel-air mixtures flow from the channel, said turbulence chamber providing an abrupt increase in cross-sectional area for the fuel-air flow, said turbulence chamber having a diameter which is at least twice the diameter of the intake channel and a length in the direction of flow of the fuel air mixtures which is at least four times the diameter of the intake channel, said turbulence chamber having at least one outlet for the flow of the fuel-air mixtures to the engine cylinders, and means actuated by the difference in pressure between atmospheric pressure and pressure in the turbulence chamber for approximately maintaining at full power operation at all engine speeds a predetermined pressure drop between atmospheric pressure and the pressure in the entrance portion of the turbulence chamber.

2. Apparatus for supplying fuel-air mixtures to internal combustion engines as described in claim 1 in which the predetermined pressure drop between atmospheric pressure and the pressure in the turbulence chamber is at least approximately two inches of mercury.

3. Apparatus for supplying fuel-air mixtures to internal combustion engines as described in claim 1 and having a shaft on which said throttle valve is mounted, an epicyclic gear train, said gear train having two gears and a planetary gear carried by an arm which freely rotates around the axis of the throttle valve and which planetary gear is in mesh with both other gears, one of said two gears being rigidly connected to the shaft which carries the throttle valve, control linkage connected to the other of two gears and movable to rotate said gear to open and close the throttle valve and means responsive to the pressure at the entrance of the turbulence chamber for moving the arm which carries the planetary gear to rotate the gear connected to said shaft to position the throttle valve so as to secure a predetermined minimum pressure drop between atmospheric pressure and the pressure in the turbulence chamber.

4. Apparatus for supplying fuel-air mixtures to internal combustion engines as described in claim 1 and having a shaft on which said throttle valve is mounted, an epicyclic gear train, said gear train having two gears and a planetary gear carried by an arm which freely rotates around the axis of the throttle valve and which planetary gear is in mesh with both outer gears, one of said two gears being rigidly connected to the shaft which carries the throttle valve, control linkage connected to the arm which carries the planetary gear and movable to rotate said arm and rotate the gear connected to said shaft to open and close the throttle valve and means responsive to the pressure at the entrance of the turbulence chamber connected to the second of said two gears and movable to rotate said gear and position the throttle valve so as to secure a predetermined minimum pressure drop between the atmospheric pressure and the pressure in the turbulence chamber.

5. Apparatus for supplying fuel-air mixtures to internal combustion engines as described in claim 1 in which the downstream end of said channel extends into the turbulence chamber and terminates in a sharp edge.

6. Apparatus for supplying fuel-air mixtures to internal combustion engines having an intake manifold comprising an air intake channel, a fuel nozzle opening into the channel, throttle valve in the channel downstream of the fuel nozzle, a turbulence chamber positioned immediately downstream of the throttle valve into which the fuel-air mixtures flow from the channel, said turbulence chamber providing an abrupt increase in cross-sectional area for the fuel-air flow, said turbulence chamber having a diameter which is at least twice the diameter of the intake channel and a length in the direction of flow of the fuel-air mixtures which is at least four times the diameter of the intake channel, said turbulence chamber having an outlet leading to the manifold of the engine, and means actuated by the difference in pressure between atmospheric pressure and pressure in the turbulence chamber for approximately maintaining at full power operation at all engine speeds, a predetermined pressure drop between atmospheric pressure and the pressure in the entrance portion of the turbulence chamber.

7. Apparatus for supplying fuel air mixtures to the cylinders of an internal combustion engine comprising; a chamber having opposed ends; an air intake channel at each end of said chamber and positioned to direct incoming air into the chamber towards the other channel; a fuel nozzle opening into each channel; a throttle valve in each channel downsteram of the fuel nozzle, the internal cross section of said chamber relative to the cross section of each channel being such as to provide an abrupt increase in cross sectional area for the fuel-air flow from each channel into the chamber; said chamber having a diameter which is at least twice the diameter of each channel and extending from each channel in the direction of fuel-air flow into the chamber a distance at least four times the diameter of each channel, ducts leading from said chamber to individual engine cylinders and means actuated by the difference in pressure between atmospheric pressure and pressure in the turbulence chamber for approximately maintaining at full power operation at all engine speeds a predetermined pressure drop between atmospheric pressure and the pressure in the portions of the turbulence chamber adjacent the air intake channels.

8. Apparatus for supplying fuel air mixtures as described in claim 7 in which said chamber is elongated to extend the length of the engine and in which the ducts leading from the chamber to intake parts of the individual cylinders are straight and positioned on the chamber so that their length is the minimum distance between said chamber and the cylinder to which each duct leads.

9. A method of supplying a fuel air mixture to cylinders of an internal combustion engine which comprises flowing through a channel air containing coarse fuel droplets past a variable constriction in the channel to form high velocity jets of air containing fuel droplets, injecting said jets immediately into the central portion of a turbulence chamber having a larger cross section than said channel to prevent said jets impinging on the walls of said chamber and to convert a substantial portion of the kinetic energy of said jets into kinetic energy of turbulent motion and reduce the size of the fuel droplets, flowing the fuel air mixture from the turbulence chamber to the engine cylinders, and automatically approximately maintaining a predetermined sufficient minimum velocity of flow of the fuel air jets into the turbulence chamber at all engine speeds and at full power operation to obtain said energy conversion.

References Cited by the Examiner
UNITED STATES PATENTS

| | | | |
|---|---|---|---|
| 2,066,922 | 1/1937 | Wolfard | 123—52 |
| 2,293,842 | 8/1942 | Mallory | 261—65 |
| 2,452,698 | 11/1948 | Strebinger | 261—65 X |
| 2,595,721 | 5/1952 | Snyder | 261—50 |
| 2,710,604 | 6/1955 | Snyder | 261—50 X |
| 2,806,457 | 9/1957 | Mosely | 123—52 |
| 2,973,947 | 3/1961 | Sterner | 261—23 |

ROBERT F. BURNETT, *Primary Examiner.*

HARRY B. THORNTON, *Examiner.*

T. R. MILES, *Assistant Examiner.*

UNITED STATES PATENT OFFICE
CERTIFICATE OF CORRECTION

Patent No. 3,282,572　　　　　　　　　　　　　　　　November 1, 1966

Bela Karlovitz

It is hereby certified that error appears in the above numbered patent requiring correction and that the said Letters Patent should read as corrected below.

Column 2, lines 29 and 30, for $$s = \frac{1}{18} \frac{\rho}{\eta} D^2 U \qquad \text{read} \qquad S = \frac{1}{18} \frac{\rho}{\eta} D^2 U$$

line 34, for "g/cm. sec." read -- $\frac{g}{cm.\ sec.}$ --; column 6, lines 5, 6 and 7, for "4", "1.5", and "2.5" read -- 4 Hg --, -- 1.5 Hg --, and -- 2.5 Hg --; column 7, line 60, for "that ducts" read -- that the ducts --; column 8, line 60, for "of two gears" read -- of two said gears --; line 74, for "outer gears" read -- other gears --; column 9, line 40, for "downsteram" read -- downstream --; column 10, line 12, for "parts" read -- ports --.

Signed and sealed this 29th day of August 1967.

(SEAL)
Attest:

ERNEST W. SWIDER
Attesting Officer

EDWARD J. BRENNER
Commissioner of Patents